United States Patent [19]

Brooks

[11] Patent Number: 4,743,431

[45] Date of Patent: * May 10, 1988

[54] FLUIDIZATION AID INCLUDING LOW BULK DENSITY FLUIDIZATION AID

[75] Inventor: Edward F. Brooks, Hermosa Beach, Calif.

[73] Assignee: TRW Inc., Redondo Beach, Calif.

[ * ] Notice: The portion of the term of this patent subsequent to Apr. 22, 2003 has been disclaimed.

[21] Appl. No.: 926,757

[22] Filed: Nov. 4, 1986

Related U.S. Application Data

[60] Division of Ser. No. 845,666, Mar. 28, 1986, which is a continuation-in-part of Ser. No. 696,670, Jan. 30, 1985, Pat. No. 4,583,299, and a continuation-in-part of Ser. No. 684,484, Dec. 20, 1984, Pat. No. 4,591,334, and a continuation-in-part of Ser. No. 738,203, May 24, 1985, and a continuation-in-part of Ser. No. 620,996, Jun. 15, 1984, Pat. No. 4,650,657, which is a continuation-in-part of Ser. No. 339,778, Jan. 15, 1982, abandoned, which is a continuation of Ser. No. 188,201, Sep. 18, 1980, abandoned, said Ser. No. 696,670, is a continuation-in-part of Ser. No. 684,484, and a continuation-in-part of Ser. No. 620,996, said Ser. No. 684,484, is a continuation-in-part of Ser. No. 620,996.

[51] Int. Cl.$^4$ .......................... B01J 8/18; F26B 3/08; F27B 15/00

[52] U.S. Cl. ......................................... 422/139; 34/10; 208/163; 432/15; 432/58; 502/182; 502/185

[58] Field of Search ................. 422/139; 34/10, 57 A; 502/182, 185, 412, 413, 415, 416; 208/163; 432/15, 58; 118/DIG. 5; 427/273

[56] References Cited

U.S. PATENT DOCUMENTS

| | | |
|---|---|---|
| 4,583,299 | 4/1986 | Brooks ................................... 34/10 |
| 4,591,334 | 5/1986 | Brooks . |
| 4,650,657 | 3/1987 | Brooks . |

*Primary Examiner*—Barry S. Richman
*Assistant Examiner*—William R. Johnson
*Attorney, Agent, or Firm*—Shlomo Frieman; Benjamin DeWitt

[57] ABSTRACT

Tendrillar carbonaceous material is used as a fluidization aid for fluidized beds. The tendrillar carbonaceous material can be used to fluidize cohesive solids. Further, it can be used to improve fluidization of particulate solids by reducing entrainment, eliminating bubbling, and/or eliminating channelling. The tendrillar carbonaceous material can be a fibrous, particulate carbonaceous material comprising carbon fibers and a ferrous group metal component dispersed thoughout the carbon fibers as nodules. The tendrillar carbonaceous material has a bulk density of from about 0.01 to about 0.7 g/cm$^3$ and comprises an agglomeration of tendrils having a diameter of from about 0.01 to about 1 micron and a length to diameter ratio of from about 5:1 to about 1000:1.

17 Claims, 2 Drawing Sheets

FLUIDIZATION AID INCLUDING LOW BULK DENSITY FLUIDIZATION AID

CROSS-REFERENCES

This application is a division of my copending U.S. patent application Ser. No. 845,666, filed Mar. 28, 1986, which in turn is a continuation-in-part of (1) my copending U.S. patent application Ser. No. 696,670, filed Jan. 30, 1985, now U.S. Pat. No. 4,583,299; (2) my copending U.S. patent application Ser. No. 684,484, filed Dec. 20, 1984, now U.S. Pat. No. 4,591,334; (3) copending U.S. patent application Ser. No. 738,203, filed by Jack L. Blumenthal, Edward Francis Brooks, and Quentyn Hyde McKenna on May 24, 1985; and (4) my copending U.S. patent application Ser. No. 620,996, filed June 15, 1984, entitled "Method For Making Carbonaceous Materials", now U.S. Pat. No. 4,650,657, which is a continuation-in-part of my application Ser. No. 339,778, filed Jan. 15, 1982, now abandoned, which is a continuation of my application Ser. No. 188,201, filed Sept. 18, 1980, now abandoned. application Ser. No. 696,670 is a continuation-in-part of application Ser. No. 684,484 and application Ser. No. 620,996. Application Ser. No. 684,484 is a continuation-in-part of application Ser. No. 620,996. All of the above-identified applications are incorporated herein by this reference.

BACKGROUND

This invention relates to improvements in the performance of fluidized beds and techniques for fluidizing solids which heretofore could not be fluidized in a fluidized bed.

Fluidization of solids in a fluidized bed is a much used method of gas-solids contacting with many commercially successful applications in widespread fields. Fluidized beds find use in chemical reactors such as fluidized-bed catalytic crackers. Other chemical processes utilizing fluidized beds include processes for chlorination of hydrocarbons, oxidation of gaseous fuels, roasting of ore to facilitate release of valuable metals, calcination of lime in dolomite, and calcination of phosphate rock.

Fluidized beds are also used for physical contacting processes, such as for heat transfer, solids mixing, drying, size enlargement, size reduction, classification, adsorption, desorption, heat treatment, and coating. Exemplary of these processes are drying coal, cement, rock, and limestone, as well as coating metal parts with thermoplastic resins where a heated metal part is dipped into a fluidized bed of the thermoplastic resin.

An advantageous feature of fluidized beds is that fluidized beds tend to have nearly uniform temperatures and good heat transfer, both from gas to solids and from solids to internal surfaces. Further advantages are that addition or loss of solids through chemical or other means can normally be tolerated, and that rather thorough solids mixing occurs.

There are also, however, features of fluidized beds which are generally disadvantageous, and most of the disadvantages are due to bubbles. Bubbles provide a mechanism for gas bypassing, which can result in process inefficiency. The motion of the bubbles also promotes elutriation of fine particles, fragmentation of friable solids, and erosion of reactor surfaces.

Another problem experienced with fluidized beds is entrainment. As the fluidization velocity in a fluidized bed increases, entrainment of solid particles from the bed also increases, resulting in loss of material from the vessel containing the bed. This in turn increases operational costs to supply makeup material and/or to provide equipment to return entrained material to the bed.

Figure 1:
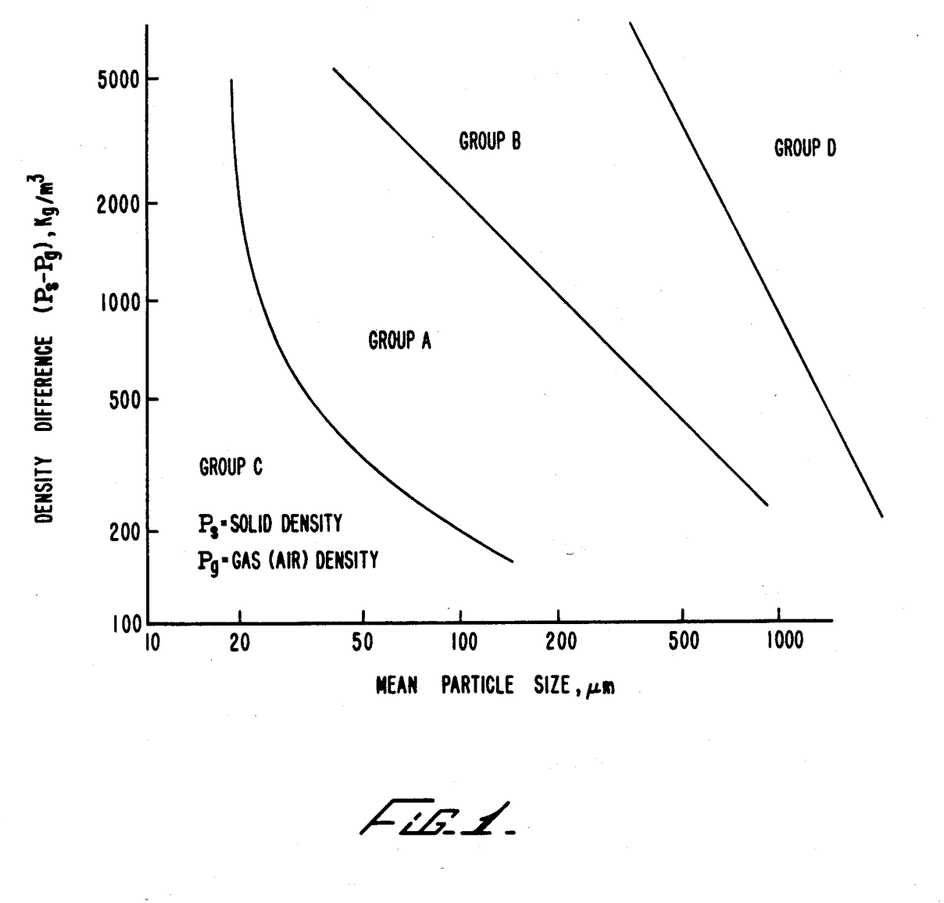
FIG. 1 shows Geldart's material classification diagram.

Advantages and disadvantages of fludized beds are most easily presented in terms of the powder classification technique described in Geldart, "Types of Gas Fluidization", *Powder Technology*, 7 (1973) 285-92. Geldart divides solid particles into groups, based on particle density and particle size, as shown in FIG. 1.

Group A materials have a small mean particle size, typically 30 to 100 microns. Most commercial fluidized catalytic operations, such as catalytic cracking, are performed with materials of this size. Beds of group A material tend to bubble freely. Moderate bed expansions in the range of about 20 to about 50% can be attained. Bubbles tend to split and recoalesce frequently. Beds of group A materials noticeably expand before bubbling commences.

Group B materials include materials having a mean particle size ranging from about 100 to about 500 microns and a particle density of from about 1.4 to about 4 g/cm$^3$. Sand is a typical group B powder. Fluidized coal combustion is an example of the use of group B material. When a group B material is fluidized, bubbles tend to be larger and more distinct than in group A materials, and there is no known limit to bubble size. Bed expansion commences with the onset of bubbling.

Group C materials are those which are in any way cohesive and generally can be fluidized only poorly or not at all. They are also known as cohesive powders. Gas tends to pass through the bed in the form of channels, resulting in poor gas/solid contact and little solids motion. Thus, in the current state of the art, Group C materials generally cannot be used in fluidized beds.

Group D material are large and/or very dense. A typical application for these very coarse materials is grain drying. Fluidization of group D materials is often performed in a spouted bed which uses a special gas distribution technique.

In view of problems associated with fluidized beds, there is a need for a technique that will improve the quality of fluidization of group A and group B materials, which are the materials most commonly used in fluidized bed processes, and for a technique which will permit good quality fluidization of group C cohesive powders.

SUMMARY

The present invention satisfies this need. According to the present invention, a particulate solid is fluidized in a fluidized bed by using tendrillar carbonaceous material as a fluidization aid. The mass ratio of tendrillar carbonaceous material to particulate solid is from about 1:33 to about 4:1. The particulate solid has a mean particle size of from about 0.1 to about 200 microns and a density of from 0.1 to 8 g/cm$^3$. When the particulate solid is a cohesive powder, it has a mean particle size of from about 0.1 to about 120 microns and a density of from 0.1 to 4 g/cm$^3$. The tendrillar carbonaceous material typically has a composition different from the composition of the particulate solid. The tendrillar carbonaceous material has a bulk density of from about 0.01 to about 0.7 g/cm$^3$. The typical mean size of tendrillar carbonaceous material is about 5 to about 50 microns as measured by a micromerograph.

The tendrillar carbonaceous material comprises an agglomeration of tendrils having a diameter of from about 0.01 to about 1 micron, and a length to diameter ratio ranging from about 5:1 to about 1000:1. More typically the tendrils have a diameter of from about 0.1 to about 0.3 micron and a length to diameter ratio of from about 5:1 to about 50:1.

The tendrillar carbonaceous material can be ferrous carbon, which is a fibrous, particulate, carbonaceous material. In ferrous carbon, the tendrils comprise carbon fibers and a ferrous group metal component dispersed throughout the fibers as nodules. These nodules are intimately associated with and at least partially bonded to the carbon fibers. This type of tendrillar carbonaceous material comprises from about 0.1 to about 60% by weight ferrous metal, from about 40 to about 99.9% by weight carbon, and up to about 1.5% by weight hydrogen.

The use of tendrillar carbonaceous material as a fluidization aid allows fluidization of solids, such as cohesive solids, that heretofore could not be effectively fluidized. Further, tendrillar carbonaceous material when used as a fluidization aid for an already fluidizable material having a particle size less than about 200 microns, results in more effective fluidization of solids than heretofore possible, with enhanced gas/solid contact through reduction of bubbling, enhanced solids mixing, and/or reduced entrainment.

The present invention also contemplates the use of tendrillar carbonaceous material in a two layer fluidized bed. The two layer bed has a lower fluidized layer comprising a first particulate solid having a mean particle size greater than about 200 microns and a density greater than about 0.8 g/cm$^3$. This fluidized bed also has an upper fluidized layer on top of and substantially separate from the lower fluidized layer. The upper fluidized layer comprises tendrillar carbonaceous material having a particle size and bulk density less than those of the first particulate solid. Typically the first particulate solid and the tendrillar carbonaceous material have different compositions. The upper fluidized layer can also contain a second particulate solid having a mean particle size of less than about 200 microns. Fluidizing gas is passed up through the layers with sufficient velocity to fluidize the first particulate solid in the lower layer and the second particulate solid and the tendrillar carbonaceous material in the upper layer, where the two layers remain substantially separate with the interface between the two layers being substantially distinct.

DRAWINGS

These and other features, aspects, and advantages of the present invention will become better understood from the following description, appended claims, and accompanying drawings where:

DESCRIPTION

Tendrillar carbonaceous material is used as a fluidization aid. By the term "tendrillar carbonaceous material" is meant carbon-containing material comprising tendrils or slender coiling filaments. Tendrillar carbonaceous material can consist essentially of an agglomeration of tendrils which have a diameter of from about 0.01 to about 1 micron, preferably from about 0.1 to about 0.3 micron, and a length to diameter ratio of from about 5.1 to about 1000:1, preferably from about 50:1 to about 500:1. The tendrils are building blocks that form larger agglomerates that are of value in fluidized bed applications. The size of the agglomerates formed is a function of the manufacturing process and of the environment to which the material is subjected.

The amount of agglomeration produced can be measured with commonly used size characterization techniques. One technique uses a micromerograph, which is a device that subjects a material to be measured to high shear forces followed by dispersion in a gas. Size determination is then performed on the dispersed particles using an aerodynamic technique. In a second technique, the material is dispersed in a suitable liquid and subjected to ultrasonic vibration to produce deagglomeration. This technique can be used to prepare samples for scanning electron microscope analysis. Both techniques are essentially deagglomerating techniques which tend to produce a size distribution of the tendrillar carbonaceous material in which the mass mean particle size is many times the diameter of the individual tendrils. Typically, this mass mean particle size for the tendrillar carbonaceous material as measured by such a deagglomerating techniques is in the range of about 5 to about 50 microns.

In a fluidized bed, however, the tendrillar carbonaceous material is subjected to smaller shear forces than in a micromerograph, and is therefore generally present in a concentrated rather than dispersed manner. This leads to the formation of agglomerates of tendrillar carbonaceous material in the fluidized bed. For typical fluidized bed operation, the mass mean particle size of the tendrillar carbonaceous material agglomerates is from about 200 to about 3000 microns. This size range has been determined from direct visual and photographic observation, from bed expansion/particle size correlations, and from entrainment rate/particle size correlations. These large agglomerates can be broken down into smaller particles through deagglomeration techniques such as micromerograph processing. The combination of the properties of the tendrils and the fluidized agglomerate size is believed to be important to provide the beneficial effects of the present invention.

Figure 2A:
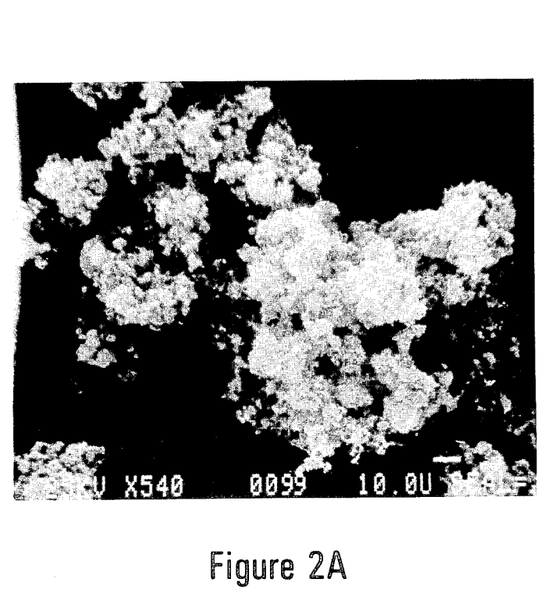
FIGS. 2A and 2B are photomicrographs showing tendrillar carbonaceous material through a scanning electron microscope under relatively low magnification (540x) and under relatively high magnification (20,000x), respectively.
Figure 2B:
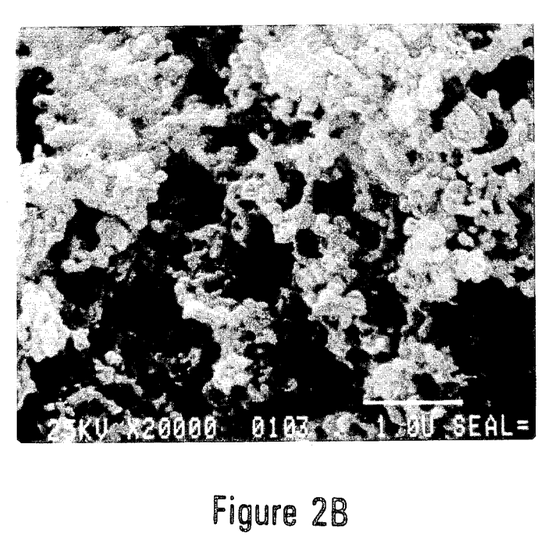

The tendrillar carbonaceous material can be "ferrous carbon" which is a fibrous, particulate, carbonaceous material comprising carbon fibers and a ferrous group metal component. The ferrous group metal component is dispersed throughout the carbon fibers as nodules that are intimately associated with and at least partially bonded to the carbon fibers. The ferrous carbon comprises from about 0.1 to about 60% by weight ferrous metal, from about 40 to about 99.9% by weight carbon, and up to about 1.5% by weight hydrogen. By the term "ferrous metal" there is meant a metal of Group VIII of the Periodic Table of the Elements, such as iron, cobalt, nickel, and combinations, carbides, oxides and alloys thereof. If desired, a portion of the metal can be removed such as by acid treatment. Ferrous carbon material is shown in FIGS. 2A and 2B.

Methods for making the ferrous carbon form of tendrillar carbonaceous material are described in parent application Ser. No. 620,996 filed June 15, 1984 and U.S. patent application Ser. No. 99,789 filed Dec. 3, 1979, which is incorporated herein by this reference.

Generally, this form of tendrillar carbonaceous material is made by disproportionating carbon monoxide in the presence of a ferrous group metal component catalyst which can be metal, an alloy, a carbide or other metallic substance. Carbonaceous material forms and grows from the catalyst surface primarily in the form of fibers. These fibers become tangled masses that occupy increasingly larger volumes in the reactor. Preferably the ferrous carbon is prepared in a fluidized bed containing an abradant and is elutriated overhead as described in the parent application. The ferrous carbon form of tendrillar carbonaceous material produced by these methods includes a major phase and a minor phase, the major phase comprising from about 95 to about 99.9% by weight carbon, from about 0.1% to about 1.5% hydrogen, and the balance, if any, being the ferrous metal. The minor component is the nodules which are dispersed throughout the major phase and are intimately associated with and at least partly bonded to the carbon in the major phase. The minor phase comprises carbon and at least 50% by weight ferrous metal.

Very low bulk density tendrillar carbonaceous material, i.e. tendrillar carbonaceous material having a bulk density of less than about 0.1 g/cm$^3$ and down to about 0.01 to about 0.02 g/cm$^3$, can be prepared according to the methods described in U.S. patent application Ser. No. 738,203 filed May 24, 1985, which is incorporated herein by this reference. In these methods, previously formed low bulk density tendrillar carbonaceous material is blended with iron, and the blend is used to disproportionate carbon monoxide to form additional low bulk density tendrillar carbonaceous material.

Tendrillar carbonaceous material can also be prepared by passing hot hydrocarbons over a ferrous metal catalyst. The ferrous metal content of the tendrillar carbonaceous material produced by these methods can be reduced by acid treatment.

Tendrillar carbonaceous material can be used as a fluidization aid for Geldart group C cohesive powders. Exemplary of such cohesive powders are kieselguhr having a mean particle size of about 15 microns and a bulk density of about 0.22 g/cm$^3$; iron oxide having a mean particle size of about 0.5 microns and a bulk density of about 2.3 g/cm$^3$; and angular alumina having a mean particle size of about 9 microns and a bulk density of about 1.2 g/cm$^3$. Normal fluidization of these powders is extremely difficult; the powder lifts as a plug or channels badly, i.e., the gas passes through voids extending from the fluidizing gas distributor to the bed surface. It is believed that these powders exhibit cohesive behavior because the interparticle forces are greater than those which the fluidizing gas can exert on the particle.

For cohesive powders, the mass ratio of tendrillar carbonaceous material to cohesive powder is preferably from about 1:9 to about 4:1. Generally, the bulk density of tendrillar carbonaceous material is less than that of the cohesive powder, although it can be the same as or greater than the bulk density of the cohesive powder. Generally, the mean particle size of the tendrillar carbonaceous material is greater than the mean particle size of the cohesive powder. Unless indicated otherwise, all particle sizes presented herein are mass "mean particle sizes", and in the case of tendrillar carbonaceous material, are determined with a micromerograph.

Tendrillar carbonaceous material can also be used as a fluidization aid for Geldart group A materials and Geldart group B materials having a mean particle size of less than about 200 microns. These materials can generally be fluidized. However, fluidized beds of such materials suffer adverse effects from bubbles, such as gas bypassing, high entrainment, solids fragmentation, and/or erosion of reactor surfaces. The primary function of the fluidization aid is to reduce bubbling. This has the positive effects of reducing gas bypassing, increasing the rate of solids circulation, decreasing solids fragmentation, decreasing erosion of reactor surfaces, and/or reducing solids entrainment.

Exemplary of Geldart group A materials are fluid cracking catalyst with a mean size of about 67 microns and a particle density of about 1.6 g/cm$^3$, and 180 and 320 grit angular alumina. Exemplary of small group B materials are angular alumina with a mean size of about 120 microns and a particle density of about 3.6 g/cm$^3$, and iron powder with a mean particle size of about 80 microns and a particle density of about 7.5 g/cm$^3$. When used as a fluidization aid with these particulate materials, tendrillar carbonaceous material is used in a sufficient amount to provide a tendrillar carbonaceous material to particulate solid mass ratio ranging from about 1:30 to about 1:1 to effect significant reduction in bubbling and achieve the beneficial effects thereof.

Tendrillar carbonaceous material generally cannot be used as a fluidization aid for particles having a mean particle size greater than about 200 microns. When the mean particle size is greater than about 200 microns, a two layer fluidized bed tends to form, as described below.

The tendrillar carbonaceous material can be used in a two layer fluidized bed. A lower fluidized layer contains a first particulate solid having a mean particle size greater than about 200 microns and a density greater than about 0.8 g/cm$^3$. An upper fluidized layer is on top of and substantially separate from the lower fluidized layer. The upper fluidized layer comprises tendrillar carbonaceous material having a bulk density of from about 0.01 to about 0.7 g/cm$^3$. The tendrillar carbonaceous material typically has a mean particle size of from about 5 to about 50 microns. Because of the low density and small size of the tendrillar carbonaceous material compared to the density and size of the first particulate solid, the tendrillar carbonaceous material stays in the upper fluidized layer. For example, when the first particulate solid and the tendrillar carbonaceous material are placed together in a vessel, and then fluidizing gas is passed upwardly through the vessel, the tendrillar carbonaceous material and the first particulate solid separate to form the upper and lower fluidized layers, respectively. The composition of the tendrillar carbonaceous material is generally different from the composition of the first particulate solid.

The upper layer can contain, in addition to the tendrillar carbonaceous material, a second particulate solid, which typically has a composition different from the composition of the tendrillar carbonaceous material. The second particulate solid generally has a mean particle size of less than about 200 microns so that it remains in the upper layer. The second particulate solid generally is a Geldart group A or Geldart group C material.

In use of this dual layer fluidized bed, fluidizing gas forms bubbles in the lower fluidized layer, and the upper fluidized layer contains sufficient tendrillar carbonaceous material to dissipate the bubbles formed in the lower fluidized layer. In effect, the lower layer acts as a bubble formation zone, preferably containing particles having a mean particle size of from about 200 to about 300 microns and a bulk density in the range of about 1.4 to about 4 g/cm³. This lower layer produces gas bubbles in the range of about 5 to about 15 centimeters in diameter, depending upon the diameter of the reactor. These bubbles break up upon reaching the upper layer. The purpose of these bubbles is to provide agitation to the upper layer to enhance circulation of solids.

In other applications, a shallow lower layer can be used to form bubbles which, when they reach the upper layer containing the tendrillar carbonaceous material, provide agitation to the upper layer to enhance solid circulation.

Tendrillar carbonaceous material can also be used as a fluidization aid in combination with a particulate solid having a broad size distribution comprising particles in group B, group A, and, if desired, group C. In this case, the fluidized bed forms a non-homogeneous mixture which is rich in larger particulate solids near the bottom and rich in tendrillar carbonaceous material and smaller particulate solid near the top. This configuration can be of benefit when the particulate solid is chemically consumed as part of the process. The tendrillar carbonaceous material improves process efficiency by improving gas/solid contact, and helps reduce entrainment losses of fine particles.

These and other features of the present invention will become better understood with reference to the following examples.

EXAMPLE 1

This example demonstrates the use of tendrillar carbonaceous material as a fluidization aid for a cohesive powder that otherwise could not be fluidized. The powder used was kieselguhr powder. The properties of the powder, properties of the tendrillar carbonaceous material, mass ratio of tendrillar carbonaceous material to kieselguhr powder, gas velocity, and bed expansion percentages are presented in Table 1.

TABLE 1

| Example | Particulate Material | | | Tendrillar Carbonaceous Material | | | Gas Velocity (cm/s) | Bed Expansion (%) | Comments |
|---|---|---|---|---|---|---|---|---|---|
| | Type | Mean Size (Microns) | Bulk Density (g/cm³) | Mean Size (Microns) | Bulk Density (g/cm³) | Mass Ratio (C:Particulate) | | | |
| 1A | Kieselguhr | 15 | 0.22 | — | — | 0 | 12–30 | 0 | No fluidization |
| 1B | Kieselguhr | 15 | 0.22 | 15 | 0.22 | 1:1 | 12 | 170 | Excellent fluidization |
| 1C | Kieselguhr | 15 | 0.22 | 15 | 0.22 | 1:1 | 20 | 220 | Excellent fluidization |
| 1D | Kieselguhr | 15 | 0.22 | 15 | 0.22 | 1:1 | 30 | 270 | Excellent fluidization |
| 1E | Kieselguhr | 15 | 0.22 | N/A* | 0.02 | 1:4 | 30 | 295 | Excellent fluidization |
| 2A | Iron oxide powder | 0.5 | 2.3 | — | — | 0 | 12–30 | <10 | Little fluidization |
| 2B | Iron oxide powder | 0.5 | 2.3 | 15 | 0.22 | 22:78 | 12 | 33 | Fair fluidization |
| 2C | Iron oxide powder | 0.5 | 2.3 | 15 | 0.22 | 22:78 | 20 | 42 | Fair fluidization |
| 2D | Iron oxide powder | 0.5 | 2.3 | 15 | 0.22 | 22:78 | 30 | 50 | Fair fluidization |
| 2E | Iron oxide powder | 0.5 | 2.3 | 15 | 0.22 | 1:1 | 12 | 21 | Fair fluidization |
| 2F | Iron oxide powder | 0.5 | 2.3 | 15 | 0.22 | 1:1 | 20 | 24 | Fair fluidization |
| 2G | Iron oxide powder | 0.5 | 2.3 | 15 | 0.22 | 1:1 | 30 | 45 | Fair fluidization |
| 2H | Iron oxide powder | 0.5 | 2.3 | 15 | 0.22 | 4:1 | 12 | 56 | Good fluidization |
| 2I | Iron oxide powder | 0.5 | 2.3 | 15 | 0.22 | 4:1 | 20 | 75 | Good fluidization |
| 2J | Iron oxide powder | 0.5 | 2.3 | 15 | 0.22 | 4:1 | 30 | 110 | Good fluidization |
| 3A | Angular alumina | 9 | 1.2 | — | — | 0 | 12–30 | <10 | Poor fluidization |
| 3B | Angular alumina | 9 | 1.2 | 15 | 0.22 | 16:84 | 12 | 48 | Good fluidization |
| 3C | Angular alumina | 9 | 1.2 | 15 | 0.22 | 16:84 | 20 | 73 | Good fluidization |
| 3D | Angular alumina | 9 | 1.2 | 15 | 0.22 | 16:84 | 30 | 95 | Good fluidization |
| 4 | Alumina | 122 | 1.7 | 15 | 0.22 | 0–1:1 | 30:47 | ** | Improved fluidization as mass ratio increased |
| 5A | 180 grit angular alumina | 76 | 1.7 | — | — | 0 | 12–30 | 20–32 | Bubbling |
| 5B | 180 grit angular alumina | 76 | 1.7 | 15 | 0.22 | 13:87 | 12–30 | 28–54 | No bubbling |
| 6A | 320 grit angular alumina | 31 | 1.7 | — | — | 0 | 12–30 | 22–40 | Bubbling |
| 6B | 320 grit angular alumina | 31 | 1.7 | 15 | 0.22 | 13:87 | 12–30 | 31–60 | No bubbling |
| 7A | Cracking catalyst | 67 | 0.8 | — | — | 0 | 40 | ** | Bubbling |
| 7B | Cracking catalyst | 67 | 0.8 | 18 | 0.24 | 1:19 | 40 | ** | No bubbling; reduced entrainment by factor of 7 |

*Not Available
**Not measured

The "bed expansion" of a bed is determined according to the following formula:

$E_b = [(H/H_o) - 1] \times 100\%$ where
$E_b$ = bed expansion, percent
$H$ = bed dynamic height
$H_o$ = bed rest height For all examples, ferrous carbon was the type of the tendrillar carbonaceous material. The reported gas velocity in all Examples is the superficial velocity which is gas volumetric flow divided by the bed cross-sectional area. The gas used for this Example, and all of the Examples reported herein, was nitrogen. The vessel used was a transparent unit having a cross-section of 50 cm × 1.6 cm and a height of 180 cm.

At superficial velocities of 12 to 30 cm/s (centimeters per second), the kieselguhr alone did not fluidize at all (Example 1A). The gas flowed through several large, distinct channels and there was virtually no motion of solids. For examples 1B, 1C, 1D, and 1E, the kieselguhr was mixed with tendrillar carbonaceous material. The mixing was effected by wet blending the two solids in water, draining off excess water through filter paper, drying the mixture in an oven at about 100 degrees C., and grinding the resulting cake. Grinding was with a mortar and pestle for Examples 1B, 1C, and 1D, and with a ball mill for Example 1E. Fluidization quality of the mixtures was excellent and there was no observable bubbling in the bed. The mixture were easily conveyed through a plastic tube having an inside diameter of 0.64 cm.

Comparison of the results of Example 1E with the results of Examples 1B, 1C, and 1D demonstrates that the very low bulk density ferrous carbon produced substantially the same or better results than the higher bulk density material, but required substantially less material, i.e. a mass ratio of 1:4 compared to a mass ratio of 1:1. The ability to use low bulk density tendrillar carbonaceous material (tendrillar carbonaceous material having a bulk density less than about 0.1 g/cm$^3$) in relatively small quantities to achieve effective fluidization is a particular advantage of this material.

EXAMPLE 2

This Example also demonstrates the effectiveness of tendrillar carbonaceous material as a fluidization aid for a cohesive powder. The same vessel was used as used for Example 1. The results of Example 2 are also presented in Table 1. The cohesive powder used was iron oxide powder. Without tendrillar carbonaceous material (Example 2A) some solids motion near the top of the bed in a superficial gas velocity range of 12 to 30 cm/s was achieved, but there was less than 10% bed expansion. Most of the iron oxide powder did not fluidize.

An attempt was made to combine the iron oxide powder with tendrillar carbonaceous material using the same wet technique as used in Example 1, but the mixture was found to have poor uniformity and was not tested. Mixtures having tendrillar carbon to iron oxide mass ratios of 22:78 (Examples 2B-2D), 1:1 (Examples 2E-2G), and 4:1 (Examples 2H-2J) were prepared by putting the solids into a ceramic jar and tumbling the solids by rolling the jar for several hours. Mixtures having carbon to iron oxide mass ratios of 22:78 and 1:1 had fair fluidization, without significant bubbling, but with sluggish solids movement. By increasing the carbon to iron mass ratio to 4:1, more rapid solids mixing was achieved and bubbling was absent.

EXAMPLE 3

This example demonstrates how the use of tendrillar carbonaceous material as a fluidization aid allows good fluidization of a cohesive powder that otherwise has poor fluidization characteristics. The cohesive powder used was angular alumina. Testing was performed in the same unit used for Example 1. The properties of the angular alumina, tendrillar carbonaceous material properties, mass ratios, gas velocities, and test results are presented in Table 1. The angular alumina by itself (Example 3A) fluidized poorly for awhile, and then fell out of fluidization with stable channels forming in the bed. Mixtures of angular alumina and tendrillar carbonaceous material (Examples 3B-3D) were prepared by mixing the two materials in a plastic jar and manually shaking the jar for about one minute. The fluidization quality of the mixtures was good with no apparatus bubbling and good solids mixing.

EXAMPLE 4

This Example demonstrates the effectiveness of tendrillar carbonaceous material as a fluidization aid for particulate solids having a mean particle size of from 40 to 220 microns and a bulk density of from 1.4 to 4 g/cm$^3$. The particulate material used in the test was alumina having a mean particle size of 122 microns and a bulk density of 1.7 g/cm$^3$. The test unit used was the same as used for Example 1. During this test, the tendrillar carbonaceous material to alumina mass ratio was increased from 0 to 1:1. As the tendrillar carbonaceous material content of the mixture was increased, bubble activity decreased substantially, with the bubbles becoming smaller and persisting for shorter distances before breaking up. Bed expansion increased slightly with increasing carbon content, but stayed below 100 percent. A reduction in bubble activity, compared to the pure alumina bed, because apparent at a tendrillar carbonaceous material to alumina ratio of 1:20, substantial reduction in bubble activity was apparent at 1:5, and little bubbling was evident at 1:1. As the concentration of tendrillar carbonaceous material in the bed increased, an increasingly large powder rich region grew at the top of the bed.

In a separate set of experiments, various ratios of the two materials were fluidized in a 10 cm diameter, 12 meter tall test unit to determine entrainment characteristics. Due to the large size and high density of the alumina, alumina entrainment was very low over the velocity range tested, and the tendrillar carbonaceous material did not have a substantial effect on alumina entrainment. The entrainment rate of the carbon was higher in mixtures with alumina than when tendrillar carbonaceous material was fluidized alone, probably because the alumina acted as an abradant in the mixture.

EXAMPLES 5 AND 6

These Examples demonstrate the effectiveness of tendrillar carbonaceous material as a fluidization aid for group A particles. The material used was angular alumina, 180 grit (Example 5) and 320 grit (Example 6). The properties of the angular alumina, the properties of the tendrillar carbonaceous material, the mass ratio of carbon to angular alumina, gas velocity, and bed expansion are presented in Table 1. The test unit was the same as used for Example 1.

In tests where tendrillar carbonaceous material was used in combination with the angular alumina, mixing was done by pouring the carbon into the test unit on top of the alumina bed and allowing the materials to mix while being fluidized. The beds became thoroughly mixed in about one minute.

Without tendrillar carbonaceous material, large bubbles were noted, up to 18 cm with the 180 grit alumina and up to about 13 cm with the 320 grit alumina. The addition of tendrillar carbon in a mass ratio of carbon to alumina of 13:87 ended bubbling. Further, as indicated in Table 1, the addition of the tendrillar carbonaceous material greatly increased bed expansion.

EXAMPLE 7

This Example demonstrates the effectiveness of tendrillar carbonaceous material as a fluidization aid for a particulate material having a mean particle size of 67 microns and a bulk density of 0.8 g/cm$^3$. The material tested was cracking catalyst. The properties of the tendrillar carbonaceous material used, the mass ratio of tendrillar carbonaceous material to cracking catalyst, and gas velocity are presented in Table 1. The cracking catalyst by itself fluidized in a bubbling mode. Noticeable bubble suppression was achieved by adding tendrillar carbonaceous material in a mass ratio of 1:99. Bubbling was eliminated for mass ratios of tendrillar carbonaceous material to cracking catalyst of 1:19 and higher.

EXAMPLES 8 AND 9

These Examples demonstrate the effectiveness of tendrillar carbonaceous material in reducing the entrainment of particulate solids. The particulate materials tested were 100 grit alumina, which is the same material tested in Example 4, and 900 grit alumina which is the same material tested in Example 3. The properties of the particulate material and tendrillar carbonaceous material used, mass ratios used, gas velocity, particulate material entrainment, and tendrillar carbonaceous material entrainment are presented in Table 2. The test unit was a plastic 10 cm diameter vertical chamber with a height of 12 meters. As noted in Example 4, the tendrillar carbonaceous material did not have a significant effect on the entrainment of the 100 grit alumina, other than a simple dilution effect. With the 900 grit alumina, however, use of the tendrillar carbonaceous material resulted in a very substantial decrease in entrainment of the alumina over a wide range of mixture ratios.

EXAMPLE 10

Example 10 demonstrates that tendrillar carbonaceous material was more effective than activated carbon in reducing the entrainment rate of a cracking catalyst in a fluidized bed. Properties of the cracking catalyst, tendrillar carbonaceous material, activated carbon, mass ratios used, gas velocity, particulate entrainment, and carbon entrainment are presented in Table 2. Each test lasted for about 1 hour. The activated carbon was obtained from Darco located in Wilmington, Del., Catalog No. S-51. This material was made from lignite, which, after activation with heat and steam, is thoroughly washed with mineral acids and then with water to remove extractable inorganic constituents. The remaining ash content is essentially inert and generally insoluble. The Darco activated carbon has a moisture content of about 8% and a surface area of 600 m²/g.

did the activated carbon. The activated carbon had much higher entrainment rates than the tendrillar carbonaceous material. For example, comparing Examples 10B and 10E, the entrainment rate of the cracking catalyst with activated carbon was about 6.6 times greater than the entrainment rate of the cracking catalyst using tendrillar carbonaceous material as a fluidization aid.

EXAMPLE 11

This Example demonstrates the formation of a dual layer bed. The test unit was the same as used for Example 1. Alumina powder having a bulk density of about 1.6 g/cm³ and a mean particle size of about 300 microns was placed in the test unit. Next, atomized steel powder having a bulk density of about 3.1 g/cm³ and a mean particle size of about 300 microns was placed in the test unit. The two materials mixed completely after a few minutes of fluidization at about 30 cm/s. Fluidization occurred with bubbling. Tendrillar carbonaceous material was then added to the test unit and a three component mixture was fluidized at 30 cm/s. The tendrillar carbonaceous material had a mean particle size of about 15 microns and a bulk density of 0.25 g/cm³. The tendrillar carbon had no apparent effect on the behavior of the other two materials. The bulk of the tendrillar carbonaceous material stayed in a distinctly separate layer on top of the other materials. Iron and alumina particles occasionally were thrown into the carbon layer as bubbles burst, and carbon was occasionally dragged down into the lower layer by falling iron and alumina. However, intermixing was insignificant and the boundary between the upper and lower layers was clearly defined. Bubbles emerging from the lower layer were destroyed very quickly in the carbon layer, typically over a distance corresponding to about 1 bubble diameter.

EXAMPLE 12

TABLE 2

| Example | Particulate Material | | | Fluidization Aid | | | | Gas Velocity (cm/s) | Particulate Entrainment[1] (g/cm²s) × 10⁴ | Fluidization Aid Entrainment[1] (g/cm²s) × 10⁴ |
|---|---|---|---|---|---|---|---|---|---|---|
| | Type | Mean Diameter (Micron) | Bulk Density (g/cm³) | Type | Mean Diameter (Micron) | Bulk Density (g/cm³) | Mass Ratio (Fluidizer: Particulate) | | | |
| 8A | 100 grit alumina | 110 | 1.7 | — | — | — | 0 | 40 | .2 | — |
| 8B | 100 grit alumina | 110 | 1.7 | TCM[2] | 15 | 0.27 | 1:20 | 40 | .1 | 1.1 |
| 8C | 100 grit alumina | 110 | 1.7 | TCM[2] | 15 | 0.27 | 1:20 | 40 | .1 | 1.9 |
| 9A | 900 grit alumina | 9 | 1.2 | — | — | — | 0 | 40 | 3.8 | — |
| 9B | 900 grit alumina | 9 | 1.2 | TCM[3] | 15 | 0.35 | 1:20 | 40 | 1.3 | 0.34 |
| 9C | 900 grit alumina | 9 | 1.2 | TCM[3] | 15 | 0.35 | 1:5 | 40 | 1.0 | 1.0 |
| 10A | Cracking catalyst | 67 | 0.8 | — | — | — | 0 | 40 | 27 | — |
| 10B | Cracking catalyst | 67 | 0.8 | TCM[4] | 15 | 0.24 | 1:20 | 40 | 3.8 | 0.1 |
| 10C | Cracking catalyst | 67 | 0.8 | TCM[4] | 15 | 0.24 | 1:5 | 40 | 3.9 | 0.2 |
| 10D | Cracking catalyst | 67 | 0.8 | Activated C | 45 | 0.5 | 0 | 40 | 26 | — |
| 10E | Cracking catalyst | 67 | 0.8 | Activated C | 45 | 0.5 | 1:20 | 40 | 25 | 4.2 |
| 10F | Cracking catalyst | 67 | 0.8 | Activated C | 45 | 0.5 | 1:5 | 40 | 7.1 | 18 |

[1] $\frac{M}{A \cdot T}$
where
M = mass entrained (g)
A = cross sectional area of reactor (cm²)
T = time (seconds)
[2] Tendrillar Carbonaceous Material - 89% C.
[3] Tendrillar Carbonaceous Material - 96% C.
[4] Tendrillar Carbonaceous Material - 86% C.

The test results show that the addition of tendrillar carbonaceous material to cracking catalyst reduced total entrainment compared to cracking catalyst by itself. Further, tendrillar carbonaceous material reduced entrainment of the cracking catalyst more than This Example shows the effect of tendrillar carbonaceous material on the heat transfer properties of a fluidized bed of alumina. The alumina used had a mean size of about 122 microns and a bulk density of about 1.69 g/cm³. The test unit was a steel reactor with a diameter of 16 cm and a height of 520 cm. The fluidizing gas had a velocity of 30 cm/s. The tendrillar carbonaceous material had a mean particle size of 15 microns and a bulk density of 0.25 g/cm³. In the test, heat was removed from the fluidized bed with a temperature gradient of about 300° C. Table 3 presents the carbon to alumina mass ratio in the bed and the ratio of the heat transfer of the mixture to heat transfer of alumina alone. Heat transfer decreased as the carbon concentration increased. It is believed that the decrease in heat transfer resulting from the addition of carbon resulted from the carbon collecting on the heat transfer surface.

TABLE 3

Heat Removal From Mixture (Example 12)

| C: Alumina Mass Ratio | Heat Transfer of Mixture / Heat Transfer of Alumina |
| --- | --- |
| 0 | 1 |
| 1:20 | 0.9 |
| 1:10 | 0.69 |
| 7:43 | 0.63 |
| 1:4 | 0.29 |
| 1:3 | 0.24 |
| All trendrillar carbon | 0.03 |

TABLE 4

Heat Addition to Mixture (Example 12)

| C: Alumina Mass | Heat Transfer of Mixture / Heat Transfer of Alumina |
| --- | --- |
| 0 | 1 |
| 1:20 | 0.97 |
| 1:5 | 1.65 |
| All tendrillar carbon | 0.39 |

Testing was also done for heat addition from a hot heat transfer surface, at about 520° to 630° C., to a fluidized bed, at about 500° C. The gas velocity was about 30 cm/s. The results of this heat addition test are reported in Table 4. The heat transfer of the carbon alone was surprisingly high in view of the fact that the fluidized density of the alumina was about eight times greater than that of the carbon. Further, the heat transfer of the mixture having tendrillar carbonaceous material to alumina mass ratio of 1:5 was surprising in that it was substantially higher than that of either component alone. It is believed that this occurred because at a tendrillar carbonaceous material to alumina mass ratio of 1:5, bubbling was inhibited and solids mixing was more rapid.

The tendrillar carbonaceous material itself behaved in a different mode in heat removal than it did in heat addition. In the heat removal case, the carbon clung to the cold heat transfer surface and actually acted as an insulator. In the heat addition case, the tendrillar carbonaceous material behaved in a much more advantageous manner when mixed with alumina, so that bubbling was inhibited, the solids circulation rate increased, and heat transfer was enhanced, even through the bed density was substantially lower than when the alumina was fluidized alone.

Thus, tendrillar carbonaceous material is an effective fluidization aid. It can be used to fluidize cohesive materials without significant carryover rates at high gas velocities rates without bubbling. Further, materials that otherwise could be fluidized can be fluidized with tendrillar carbonaceous material, and the tendrillar carbonaceous material can significantly decrease bubbling, decrease entrainment, and can result in improved heat transfer. The reduction in bubbling allows the use of smaller reactors with increased economies in the use of fluidized bed technology.

Although the present invention has been described in considerable detail with reference to certain preferred versions thereof, other versions are possible. For example, the fluidized bed, and particularly for a two layer fluidized bed, can contain particulate solids of varying particle sizes and densities. Therefore, the spirit and scope of the appended claims should not be limited to the description of the preferred versions contained herein.

What is claimed is:

1. A method for fluidizing a cohesive material in a mixed fluidized bed, the cohesive material having a mean particle size of from about 0.1 to about 120 microns and a particle density of from 0.1 to 4 g/cm³, the method comprising the steps of:
   (a) combining the cohesive material with tendrillar carbonaceous material in a mass ratio of tendrillar carbonaceous material to cohesive material of from about 1:9 to about 4:1, the tendrillar carbonaceous material having a bulk density of from about 0.01 to about 0.7 g/cm³ and comprising an agglomeration of tendrils having a diameter of from about 0.01 to about 1 micron and a length to diameter ratio of from about 5:1 to about 1000:1; and
   (b) passing a fluidizing gas through the combined particulate solid and tendrillar carbonaceous material at a sufficient velocity to fluidize the particulate solid and the tendrillar carbonaceous material.

2. The method of claim 1 in which the tendrils have a diameter of from about 0.1 to about 0.3 microns and a length to diameter ratio of from about 5:1 to about 50:1.

3. The method of claim 1 in which the tendrillar carbonaceous material has a mean particle size of from about 5 to about 50 microns.

4. The method of claim 1 in which the tendrils comprise carbon fibers and a ferrous group metal component dispersed throughout the carbon fibers as nodules that are intimately associated with and at least partially bonded to the carbon fibers, and wherein the tendrillar carbonaceous material comprises from 0.1 to 60% by weight ferrous metal, from 40 to 99.9% by weight carbon, and up to 1.5% by weight hydrogen.

5. The method of claim 1 in which the particulate solid is a Geldart C material.

6. The method of claim 1 including the additional step of heating the particulate solid.

7. The method of claim 1 in which the mean particle size of the tendrillar carbonaceous material is greater than the mean particle size of the cohesive material.

8. The method of claim 1 in which the tendrillar carbonaceous material has a composition different from the composition of the cohesive material.

9. The method of claim 1 in which the tendrillar carbonaceous material has a bulk density of less than about 0.1 g/cm³.

10. A composition suitable for fluidization in a mixed fluidized bed comprising:
   (a) a cohesive material having a mean particle size of from 0.1 to 120 microns and a particle density of from 0.1 to 4 g/cm³; and
   (b) tendrillar carbonaceous material having a bulk density of from about 0.01 to about 0.7 g/cm³ and comprising an agglomeration of tendrils having a diameter of from about 0.01 to about 1 micron and a length to diameter ratio of from about 5:1 to about 1000:1.

11. The composition of claim 10 in which the tendrils have a diameter of from about 0.1 to about 0.3 microns and a length to diameter ratio of from about 5:1 to about 50:1.

12. The composition of claim 10 in which the tendrillar carbonaceous material as a mean particle size of from about 5 to about 50 microns.

13. The composition of claim 10 in which the tendrils comprise carbon fibers and a ferrous group metal component dispersed throughout the carbon fibers as nodules that are intimately associated with and at least partially bonded to the carbon fibers, and wherein the tendrillar carbonaceous material comprises from 0.1 to 60% by weight ferrous metal, from 40 to 99.9% by weight carbon, and up to 1.5% by weight hydrogen.

14. The composition of claim 10 in which the particulate solid is a Geldart C material.

15. The composition of claim 10 wherein the particle size of the tendrillar carbonaceous material is greater than the particle size of the cohesive material.

16. The composition of claim 10 wherein the tendrillar carbonaceous material has a composition different from the composition of the cohesive material.

17. The composition of claim 10 in which the tendrillar carbonaceous material has a bulk density of less than about 0.1 g/cm$^3$.

* * * * *